(12) United States Patent (10) Patent No.: US 7,647,523 B2
Lindquist et al. (45) Date of Patent: Jan. 12, 2010

(54) DYNAMIC BINDING AND FAIL-OVER OF COMPARABLE WEB SERVICE INSTANCES IN A SERVICES GRID

(75) Inventors: David B. Lindquist, Raleigh, NC (US); Bala Rajaraman, Cary, NC (US); Yih-Shin Tan, Raleigh, NC (US); Brad B. Topol, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1028 days.

(21) Appl. No.: 10/170,300

(22) Filed: Jun. 12, 2002

(65) Prior Publication Data

US 2003/0233602 A1 Dec. 18, 2003

(51) Int. Cl.
*G06F 11/00* (2006.01)
(52) U.S. Cl. .......................................... 714/4
(58) Field of Classification Search ...................... 714/4; 709/225, 226
See application file for complete search history.

(56) References Cited

U.S. PATENT DOCUMENTS

| | | | |
|---|---|---|---|
| 5,951,694 A * | 9/1999 | Choquier et al. | 714/15 |
| 5,996,001 A * | 11/1999 | Quarles et al. | 709/203 |
| 6,516,350 B1 * | 2/2003 | Lumelsky et al. | 709/226 |
| 6,675,217 B1 * | 1/2004 | Dani et al. | 709/229 |
| 6,779,016 B1 * | 8/2004 | Aziz et al. | 709/201 |
| 2002/0069279 A1 | 6/2002 | Romero et al. | |
| 2003/0018766 A1 * | 1/2003 | Duvvuru | 709/223 |

(Continued)

FOREIGN PATENT DOCUMENTS

GB 2349715 11/2000

(Continued)

OTHER PUBLICATIONS

Newton, H., Newton's Telecom Dictionary, 18th edition, Feb. 2002, pp. 603-604.*

(Continued)

*Primary Examiner*—Joshua A Lohn
(74) *Attorney, Agent, or Firm*—Joseph E. Bracken, Esq.; Steven M. Greenberg, Esq.; Carey, Rodriguez, Greenberg & Paul, LLP

(57) ABSTRACT

A computing services grid. The grid can include a service desk coupled to one or more computing service instances. Each service instance can conform to an interface which is common to all service instances in the grid. A routing component can be disposed in the grid. Specifically, the routing component can route individual service requests to individual ones of the service instances. An instance selection service is used to satisfy QoS characteristics associated with the requester of the service. The grid further can include a service instance monitoring component. The monitoring component can monitor the performance of individual service instances charged with processing individual service requests. Fail-over logic can be configured to re-route service requests from selected service instances to others of the service instances where the monitoring component detects a fail-over condition in the selected service instances. In that regard, fail-over conditions can include error conditions and a performance deficiency conditions in which the performance of a selected service instance lags behind guaranteed levels of performance.

14 Claims, 4 Drawing Sheets

U.S. PATENT DOCUMENTS

| | | | |
|---|---|---|---|
| 2003/0018813 A1* | 1/2003 | Antes et al. | 709/245 |
| 2003/0051187 A1* | 3/2003 | Mashayekhi et al. | 714/4 |
| 2003/0229817 A1* | 12/2003 | Colasurdo et al. | 714/4 |
| 2004/0003077 A1* | 1/2004 | Bantz et al. | 709/224 |

FOREIGN PATENT DOCUMENTS

| | | |
|---|---|---|
| JP | 08-077120 | 3/1996 |
| WO | 0127717 A2 | 4/2001 |

OTHER PUBLICATIONS

B. Hailpern, et al., Software Engineering for Web Services: A Focus on Separation of Concerns, *IBM Research Report*, (Sep. 25, 2001).

I. Foster, et al., The Physiology of the Grid: An Open Grid Services Architecture for Distributed Systems Integration, *Globus*, (Feb. 17, 2002).

"Unraveling the Web Services Web, an Introductin to SOAP, WSDL, and UDDI", by Francisco Curbera, et al. XP-002257200, IEE Internet Computing.

* cited by examiner

DYNAMIC BINDING AND FAIL-OVER OF COMPARABLE WEB SERVICE INSTANCES IN A SERVICES GRID

BACKGROUND OF THE INVENTION

1. Statement of the Technical Field

The present invention relates to the field of Web services, and more particularly to binding Web services through the operation of a grid mechanism.

2. Description of the Related Art

Web services have become the rage of distributed computing and are viewed as the foundation for developing a truly universal model for supporting the rapid development of component-based applications over the World Wide Web. Web services are known in the art to include a stack of emerging standards that describe a service-oriented, component-based application architecture. Specifically, Web services are loosely coupled, reusable software components that semantically encapsulate discrete functionality and are distributed and programmatically accessible over standard Internet protocols.

Conceptually, Web services represent a model in which discrete tasks within e-business processes are distributed widely throughout a value net. Notably, many industry experts consider the service-oriented Web services initiative to be the next evolutionary phase of the Internet. Typically, Web services can be defined by an interface such as the Web services definition language (WSDL), and can be implemented according to the interface, though the implementation details matter little so long as the implementation conforms to the Web services interface. Once a Web service has been implemented according to a corresponding interface, the implementation can be registered with a Web services registry, such as Universal Description, Discover and Integration (UDDI), as is well known in the art. Upon registration, the Web service can be accessed by a service requestor through the use of any supporting messaging protocol, including for example, the simple object access protocol (SOAP).

Electronic utilities (eUtilities) extend the concept of Web services beyond the basic distributed computing infrastructure of WSDL, SOAP and UDDI. eUtilities refer to the offering of metered, continuous, on-demand access to computing services across a distributed computing infrastructure. Unlike the computing services of the past, eUtilities can be closely intertwined with underlying infrastructure inasmuch as different users of eUtilities can receive varying levels of responsiveness from a selected eUtility according to the terms and conditions of a negotiated service level agreement (SLA). In particular, an SLA for an eUtility can describe guaranteed performance in terms of functionality, availability, resources and availability. Thus, quality of service (QoS) remains of paramount concern in the deployment and distribution of eUtilities.

In a service-oriented application environment supporting both Web services and eUtilities, locating reliable services and integrating those reliable services dynamically in real-time to meet the objectives of an application has proven problematic. While registries, directories and discovery protocols provide a base structure for implementing service detection and service-to-service interconnection logic, present configurations neglect QoS and SLA issues in binding any one located service to a service requestor. Notably, the physiology of a grid mechanism through the Open Grid Services Architecture (OGSA) provides protocols both in discovery and also in binding of Web services and eUtilities across distributed systems.

Still, known grid mechanisms lack technology able to support the automatic, dynamic collaboration and integration of Web services and eUtilities across heterogeneous business application systems. Rather, as described in Ian Foster, Carl Kesselman, Jeffrey M. Nick and Steven Tuecke, *The Physiology of the Grid*, <http://www.globus.org/research/papers/ogsa.pdf> (Feb. 17, 2002), at best the collaboration and integration of Web services and eUtilities can be viewed as a manual process.

Notably, at present there exists limited sharing of comparable, albeit not necessarily identical Web services and eUtilities provided by and consumed by different providers and consumers, respectively. Moreover, service-oriented applications which rely upon the performance of a Web service or eUtility can become exposed to unwanted risk where an unreliable Web service or eUtility cannot be controlled and managed in real time—even where the performance has been specified according to the terms of an SLA.

SUMMARY OF THE INVENTION

The present invention is a computing services grid. The computing services grid of the present invention can organize, route, recover and switch computing services such as Web services and eUtilities automatically. The computing services grid can represent a group of comparable computing services instances through a common services entry point. Subsequently, responsive to the receipt of service requests, the computing services grid can select suitable ones of the computing services instances to process the received service requests.

Notably, the computing services grid can route service requests to selected computing services instances according not only to availability, but also according to the ability of the selected computing service instance to satisfy QoS characteristics associated with the requester of the service. Additionally, the computing services grid can monitor the performance of selected computing service instances and can perform fail-over processing where required. Thus, the computing services grid can dynamically cluster and process heterogeneous computing services in order to provide a high-level of computing services interoperability which heretofore has been unattainable in the context of conventional Web services binding.

In accordance with one aspect of the present invention, a computing services grid can include a service desk coupled to one or more computing service instances. Each computing service instance can conform to a service interface which is common to all computing service instances in the computing services grid. A routing component can be disposed in the computing services grid. Specifically, the routing component can route individual service requests to individual ones of the computing service instances.

The computing services grid further can include a service instance monitoring component. The monitoring component can monitor the performance of individual computing service instances charged with processing individual service requests. Fail-over logic can be configured to re-route service requests from selected service instances to others of the service instances where the service instance monitoring component detects a fail-over condition in the selected service instances. In that regard, fail-over conditions can include error conditions and a performance deficiency conditions in which the performance of a selected computing service instance lags behind guaranteed levels of performance.

In a services grid, a service request processing method can include receiving a service request and a specification of QoS characteristics. A specific one of several comparable service instances able to process the service request at a level consistent with the specification of QoS characteristics can be selected. Subsequently, the selected service instance can be bound to process the service request. Once bound, the performance of the selected service can be monitored. Specifically, a fail-over condition can be detected in the performance of the selected service. Where a fail-over condition has been detected, an alternative one of the several comparable service instances able to process the service request at the level consistent with the specification of QoS characteristics can be selected. Subsequently, the alternative service instance can be bound to process the service request.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a services grid through which a set of comparable computing services such as Web services or eUtilities can be accessed as a common service. Specifically, a services grid can be established to represent a group of comparable computing services through a common services entry point. Responsive to a request for a service received from a service requestor, the services grid can match an individual represented service instance to the service request. The matching service instance can be invoked and bound to the service requestor with the business services grid acting as a proxy between the service requestor and the bound service instance.

According to the present invention, the services grid can organize, route, recover and switch comparable computing services automatically. Specifically, the services grid of the present invention can be used to group distributed computing services such as Web services and eUtilities of identical or comparable abstraction, though each service may differ in terms of implementation, provider, host and network domain. Moreover, the services grid can group computing services for the purpose of brokering services through service desks in a virtual eBusiness service complex.

Importantly, fail-over logic can be included in the service grid in order not only to perform reliability assurance according to guaranteed service levels specified in an established SLA, but also to perform failure-detection and self-recovery for failing comparable service instances. In that case, the service grid can transparently substitute a comparable service instance for an already bound service instance which no longer can provide services to a service requester due to unavailability, unsatisfactory performance, or outright failure. Thus, the services grid can perform fail-soft processing to comparable alternative services should exceptions occur.

Figure 1:
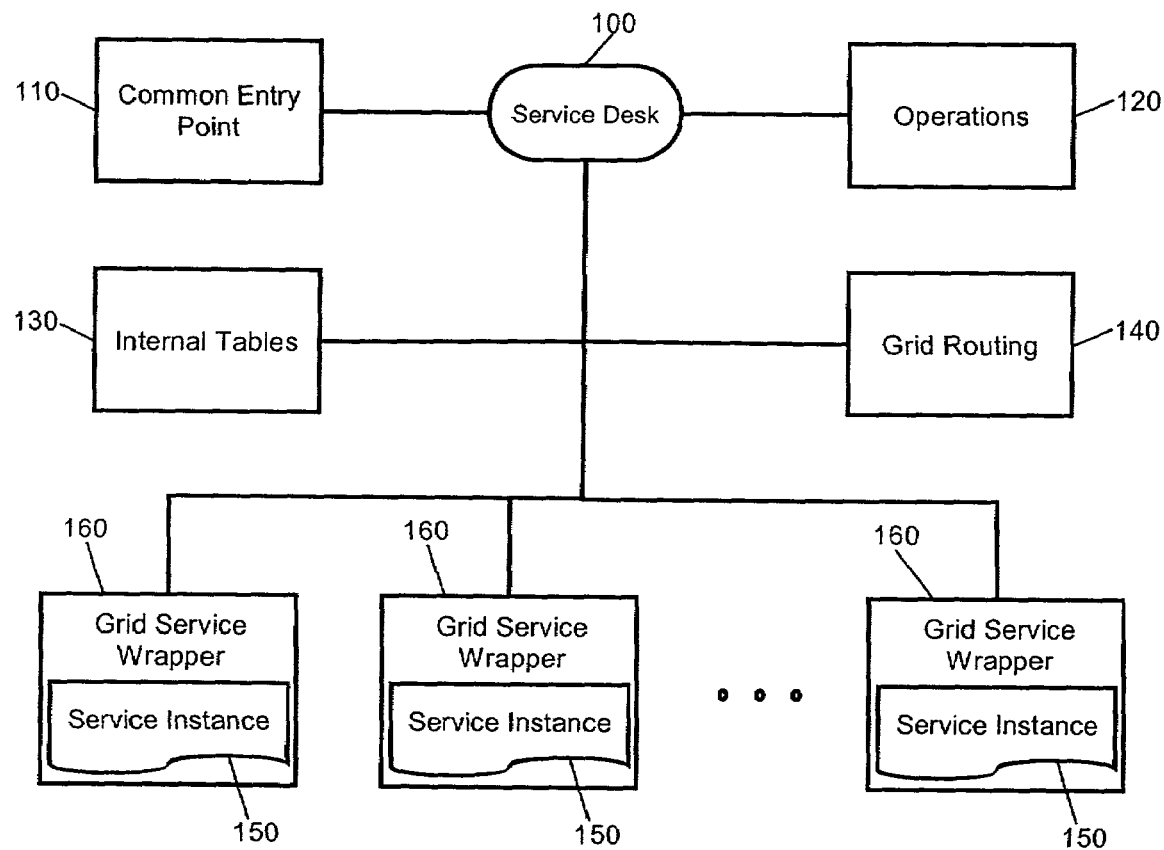
FIG. 1 is a block illustration of a services grid which has been configured in accordance with a preferred aspect of the present invention.

FIG. 1 is a block illustration of a service grid which has been configured in accordance with a preferred aspect of the present invention. A service grid can include a service desk 100. The service desk 100 can include both a common entry point 110 and a set of operations 120. Specifically, the common entry point 110 can define an abstract service aggregated from individual service abstractions using a formal definition language such as the Web Services Definition Language (WSDL). In that regard, the common entry point can specify a uniform resource identifier (URI) to the service desk 100, a set of available operations 120, one or more valid message formats, and one or more valid transport bindings.

The operations 120 can include maintenance type operations such as adding or removing a listing to one or more service instances 150, a referral inquiry, and an operation for setting or modifying the terms of or a complete SLA. The operations 120 further can include optional operations for submitting a service request to a service instance 150, for retrieving a response to a service request from a service instance 150, and for checking the status of a service instance 150. Finally, the operations 120 can include operations both for event publishing and for setting recovery rules and exception handlers. In sum, the common entry point 110 can serve as the sole external reference component for the service grid.

The service grid, itself, can be optionally implemented according to OGSA and can include one or more internal tables 130 populated with data derived from a private registry such as a private UDDI. The tables 130 can maintain a handles, search keys and corresponding pointers to reference information for each service instance 150 included in the service grid. The reference information, itself, can include, for example, descriptive markup such as WSDL, a QoS matrix, a supplemental QoS matrix, and status and exception descriptors. In any case, the tables 130 can provide a data structure able to support the operation of the service grid.

In operation a service instance 150 can be added to the service grid through the selection of the add listing operation. Conversely, a service instance 150 can be removed from the grid through the selection of the remove listing operation. Before adding a service instance 150 to the service grid, the service desk 100 can verify the reliability of the service instance 150 and can add a supplemental QoS matrix to the internal tables 130. Furthermore, disparate service instances 150 can be encapsulated within a uniform grid service wrapper 160 so as to facilitate the interoperability of the service grid with both grid and non-grid service instances 150.

Once operable, a service instance 150 can be repaired or upgraded merely by modifying the status descriptor for the service instance 150. Upon receiving a service request in the service grid, the service desk 100 can invoke a grid routing component 140 to identify a suitable service instance 150 listed in the internal tables. In particular, based upon either real-time or pre-selected SLA level specifications, the grid routing component 140 can select a suitable service instance 150 to satisfy the service request according to the responsiveness and reliability required by the terms of an associated SLA. Notably, once a service instance 150 has been bound to a transaction, the state of health of the service instance 150 can be monitored by the grid routing component 140 and fail-over can be performed when necessary through exception handling and recovery included as part of the operations 120.

Figure 2:
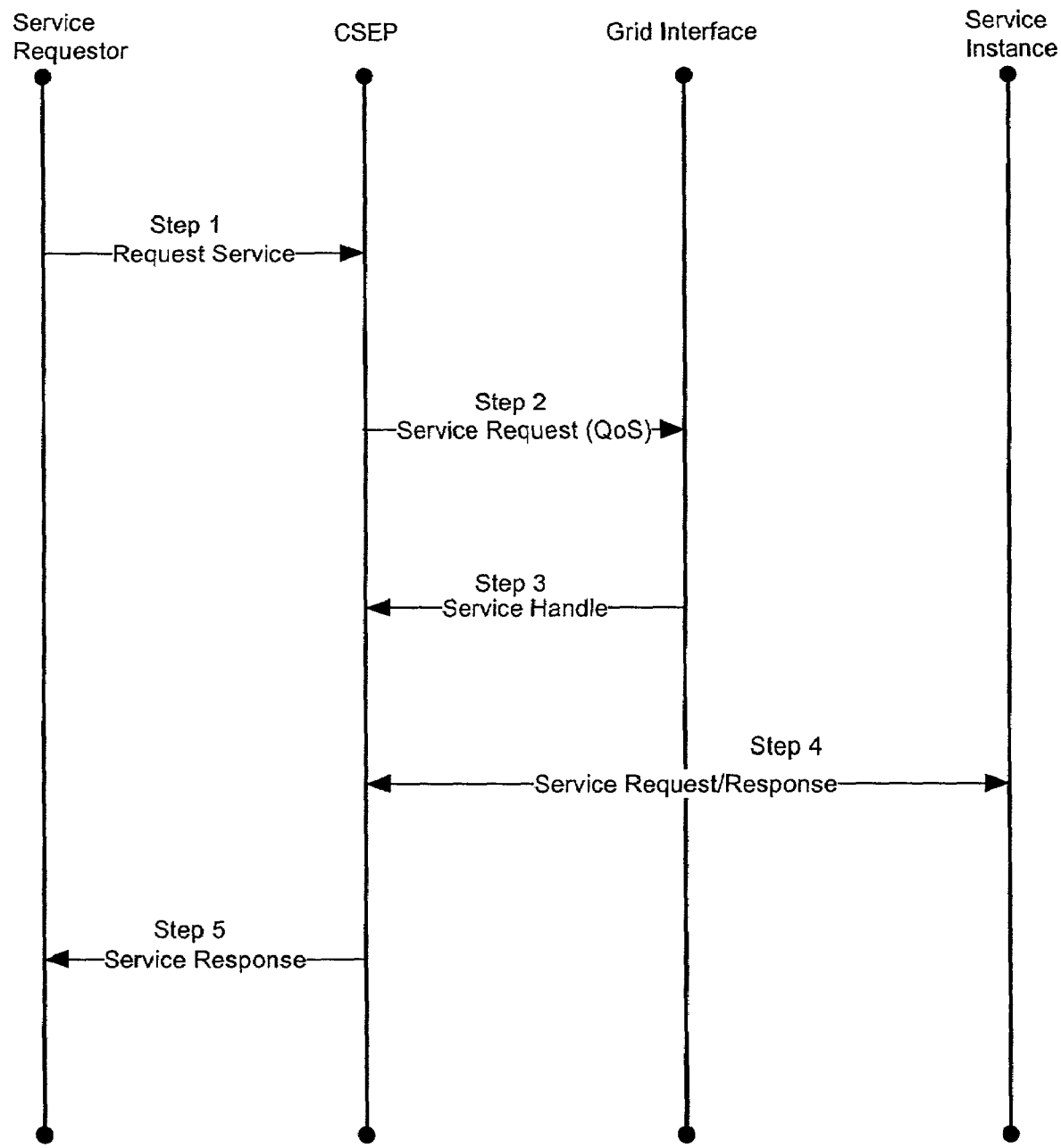
FIG. 2 is a timing chart illustrating a service instance binding process in the services grid of FIG. 1.

FIG. 2 is a timing chart illustrating a service instance binding process in the services grid of FIG. 1. In step one, a service requester can forward a service request to the common service entry point for the service grid. For instance, the service request can be encapsulated in a SOAP envelope containing a service invocation message. In step two, the common service entry point can invoke a suitable operation though an interface to the services grid such as OGSA. Specifically, the common service entry point can invoke an operation for initiating an actual service instance. In particular, required QoS characteristics can be provided to the grid services interface so that the grid services interface can invoke a service to select a particular service instance able to respond to the service request while meeting required QoS levels.

In step three, a grid services interface discovery service can search through the internal tables to locate a factory service for creating an instance of the requested service. Once located, the service instance can be created by the factory and a handle to the created service instance can be returned to the common service entry point. In step four, the common service entry point can forward the service request to the created service instance using the handle provided to the common service entry point by the grid services interface. Once the service request has been received by the created service instance, the created service instance can process the service request and can return a response to the common service entry point. Finally, in step 5 the common service entry point can forward the response to the service requestor.

Figure 3A:
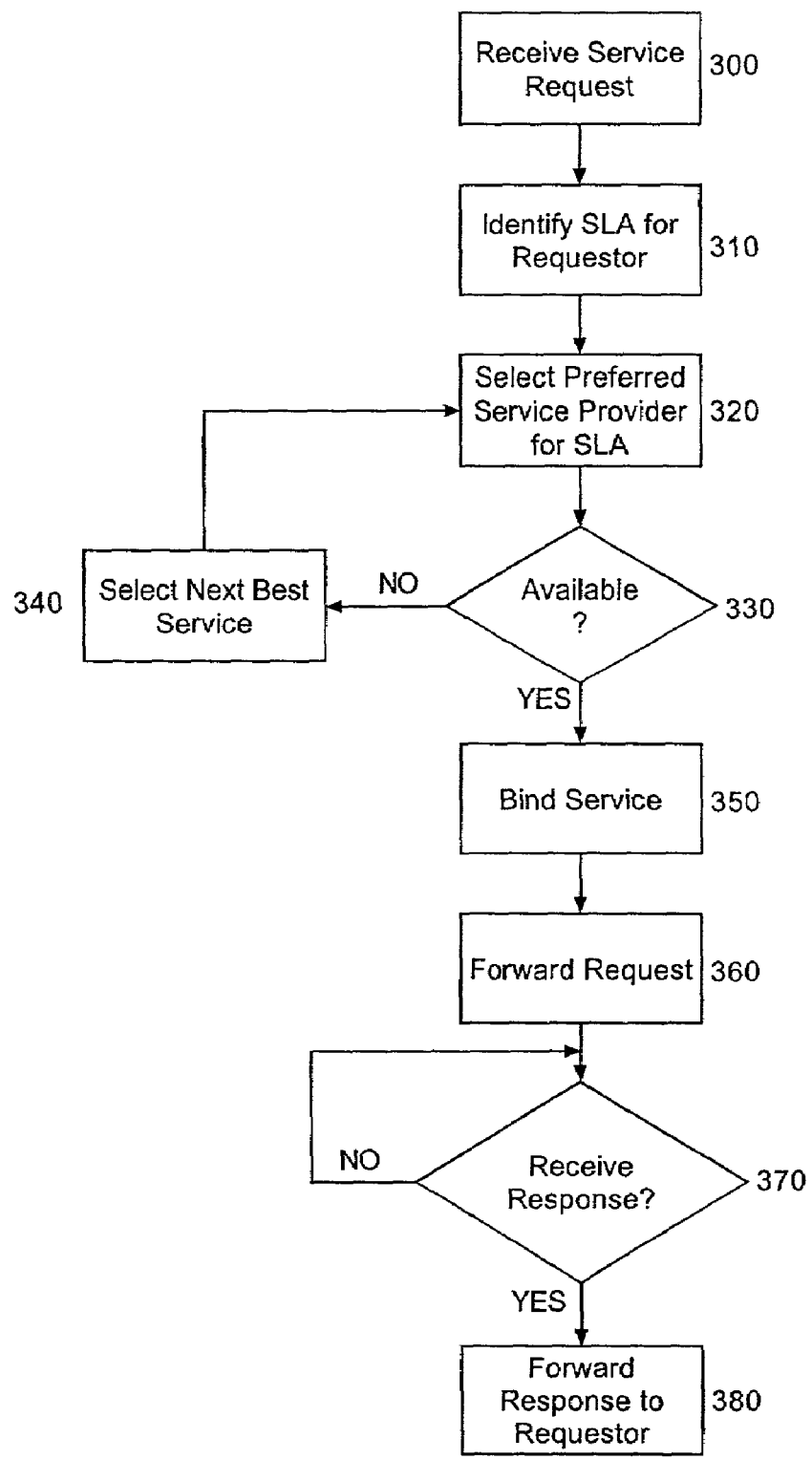
FIG. 3A is a flow chart illustrating a process for matching a comparable service instance with a service request in the services grid of FIG. 1; and, FIG. 3B is a flow chart illustrating a fail-soft process for performing service instance fail-over in the services grid of FIG. 1.

Significantly, unlike the conventional process of binding computing services to respond to service requests, in the present invention, the services grid can automatically bind particular service instances to respond to service requests according to the responsiveness and reliability of a particular service instance and the level of responsiveness and reliability required by SLA and QoS terms associated with the service requester. In this regard, FIG. 3A is a flow chart illustrating a process for matching a comparable service instance with a service request in the services grid of FIG. 1. Beginning in block 300, a service request can be received from a service requester. In block 310, an SLA or SLA terms can be identified for the requestor. The SLA or SLA terms can specify a minimum level of responsiveness and reliability guaranteed to the service requestor.

In block 320, based upon the identified SLA or SLA terms and the requested service, the services grid can consult internal tables to select a service instance from among a set of comparable service instances which can respond to the service request. In decision block 330, the status of the selected service instance can be inspected to determine the availability of the selected service instance. If the selected service instance is not available, in block 340 the next best service instance able to satisfy the SLA or SLA terms and the service request can be selected and the process can repeat. Otherwise, the process can continue in block 350.

In block 350, the selected service instance can be bound to respond to the service request. Subsequently, in block 360 the service request can be forwarded to the bound service instance. In block 370, it can be determined whether a response has been received from the bound service instance. In not, the process can wait for a response to the service request from the bound service instance. Otherwise, in block 380, the received response can be forwarded to the service requester. Importantly, the responsiveness and reliability of a bound service instance can be guaranteed through performance monitoring and fail-over components of the services grid of the present invention.

Figure 3B:
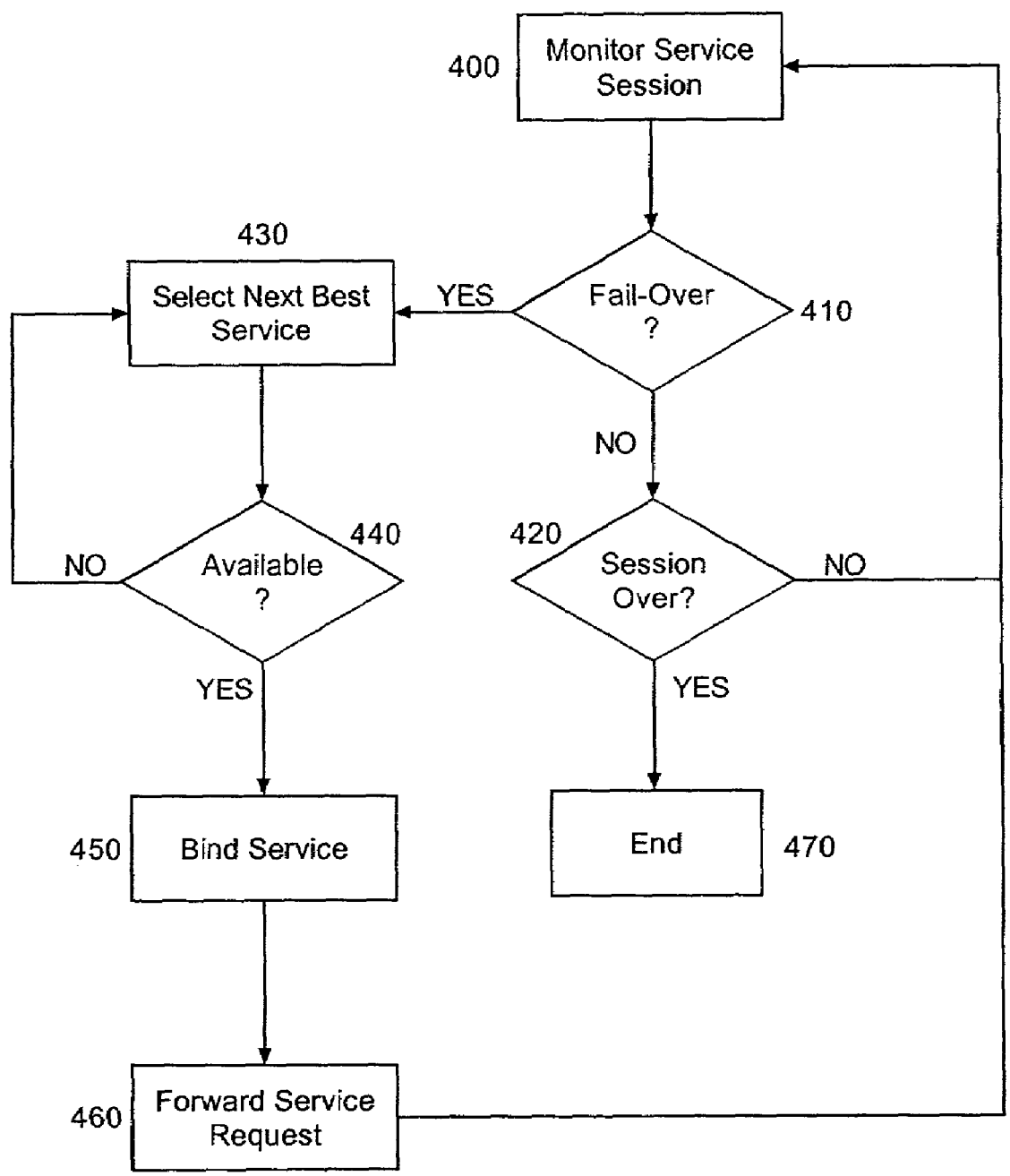

In that regard, FIG. 3B is a flow chart illustrating a fail-soft process for performing service instance fail-over in the services grid of FIG. 1. Beginning in block 400, the progress of a request-response session between a bound service instance and the common services entry point can be monitored for performance and reliability. In decision block 410, the bound service instance can be tested for fail-over. Specifically, at one extreme it can be determined whether an error has occurred in the bound service instance such that the bound service instance cannot complete the session. Alternatively, the quality of the session can be compared to quality levels guaranteed by QoS terms or the terms of an SLA.

Where the quality of the session is determined to adequately satisfy guaranteed levels of quality, in decision block 420 it can be determined if the session has ended. If so, the session can end in block 470. Otherwise, the session can proceed and the quality of the session can be continually monitored in block 400. If, however, in block 410 it is determined that the quality of the session lags guaranteed levels of quality for the session, in block 430 the internal tables of the service grid can be consulted to identify a next best service instance which is configured to satisfy the guaranteed levels of quality. If, in decision block 440 the identified service instance is not available, the process can repeat in block 430. Otherwise, in block 450 the next best service instance can be bound to satisfy the service request and in block 460, the service request can be forwarded to the newly bound service instance.

In accordance with the present invention, a service grid can organize, route, recover and switch computing service such as Web service and eUtilities automatically. Specifically, a services grid can be established to represent a group of comparable services through a common services entry point. Subsequently, the services grid can automatically bind service instances to handle individual incoming service requests. Furthermore, the services grid can perform fail-over processing to comparable alternative service instances where exceptions or performance deficiencies are detected.

Dynamic e-business requires real-time sharing and integration of many ready-made, off-the-shelf, atomic, but heterogeneous computing services such as Web services and eUtilities. Conventional systems require manual service binding and provide merely primitive routing of service requests to computing services. The present invention overcomes the deficiencies of conventional systems by providing automated service binding and routing according to conditional programming logic in order to ensure minimum levels of performance and reliability mandated by QoS terms and the terms of existing SLAs.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a)

conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A computing services grid comprising:
    a service desk coupled to a plurality of service instances, said service instances conforming to a common service interface; and,
    a routing component disposed in the service grid, said routing component routing individual service requests to individual ones of said service instances, wherein
    the individual ones of said service instances to which the individual service requests are routed are selected based upon a specification of quality of service (QoS) characteristics associated with a requestor of the service request.

2. The computing services grid of claim 1, further comprising:
    a service instance monitoring component for monitoring a performance of selected service instances in processing the service requests; and,
    fail-over logic configured to re-route service requests from the selected service instances to others of said service instances where said service instance monitoring component detects a fail-over condition in said performance of said selected service instances.

3. The computing services grid of claim 2, wherein said fail-over condition comprises one of an error condition and a performance deficiency condition which lags behind guaranteed levels of performance.

4. The computing services grid of claim 1, further comprising a service instance factory configured to instantiate individual ones of said service instances responsive to receiving a service request.

5. The computing services grid of claim 1, further comprising a grid services interface through which said service desk can locate and bind individual ones of said service instances to respond to service requests using a selection service.

6. The computing services grid of claim 5, wherein said grid services interface conforms to an open standard.

7. In a services grid, a service request processing method comprising the steps of:
    receiving a service request and a specification of quality of service (QoS) characteristics associated with a requestor of the service request;
    selecting a specific one of several comparable service instances able to process said service request at a level consistent with said specification of QoS characteristics; and,
    binding said selected service instance to process said service request.

8. The method of claim 7, further comprising the steps of:
    monitoring the performance of said bound service;
    detecting a fail-over condition in said performance in processing the service request; and,
    where a fail-over condition has been detected, selecting an alternative one of said several comparable service instances able to process said service request at said level consistent with said specification of QoS characteristics, and binding said alternative service instance to process said service request.

9. The method of claim 8, wherein said detecting step comprises the step of detecting an exception in said selected service.

10. The method of claim 8, wherein said detecting step comprises the step of detecting a level of performance in said selected service which lags said specification of QoS characteristics.

11. A machine readable storage having stored thereon a computer program for processing service requests in a service grid, said computer program comprising a routine set of instructions for causing the machine to perform the steps of:
    receiving a service request and a specification of quality of service (QoS) characteristics associated with a requestor of the service request;
    selecting a specific one of several comparable service instances able to process said service request at a level consistent with said specification of QoS characteristics; and,
    binding said selected service instance to process said service request.

12. The machine readable storage of claim 11, further comprising the steps of:
    monitoring the performance of said bound service in processing the service request;
    detecting a fail-over condition in said performance; and,
    where a fail-over condition has been detected, selecting an alternative one of said several comparable service instances able to process said service request at said level consistent with said specification of QoS characteristics, and binding said alternative service instance to process said service request.

13. The machine readable storage of claim 12, wherein said detecting step comprises the step of detecting an exception in said selected service.

14. The machine readable storage of claim 12, wherein said detecting step comprises the step of detecting a level of performance in said selected service which lags said specification of QoS characteristics.

* * * * *

UNITED STATES PATENT AND TRADEMARK OFFICE
CERTIFICATE OF CORRECTION

| | | |
|---|---|---|
| PATENT NO. | : 7,647,523 B2 | Page 1 of 1 |
| APPLICATION NO. | : 10/170300 | |
| DATED | : January 12, 2010 | |
| INVENTOR(S) | : Lindquist et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1262 days.

Signed and Sealed this

Sixteenth Day of November, 2010

David J. Kappos
*Director of the United States Patent and Trademark Office*